Dec. 29, 1964 S. KRIZMAN 3,163,451

ROTATABLE STUD CONSTRUCTION

Filed May 31, 1962 2 Sheets-Sheet 1

INVENTOR.
STEVE KRIZMAN
BY Hobbs & Easton
ATTORNEYS

INVENTOR.

STEVE KRIZMAN

BY Hobbs & Easton

ATTORNEYS

United States Patent Office 3,163,451
Patented Dec. 29, 1964

3,163,451

ROTATABLE STUD CONSTRUCTION

Steve Krizman, South Bend, Ind., assignor to Krizman Manufacturing Co., Inc., South Bend, Ind., a corporation of Indiana Filed May 31, 1962, Ser. No. 198,933
2 Claims. (Cl. 287—93)

The present invention relates to a stud construction, and more particularly to a rotatable stud construction forming a part of the steering assembly for automobiles, primarily as a replacement stud in repairing steering assemblies.

On many conventional present day automobiles, the studs at the two ends of the center link of the automobile become worn and loose, causing substantial play in the steering mechanism and occasionally complete failure of the mechanism, sometimes resulting in accidents and/or costly repairs. The conventional center link studs do not have either a lubricating fixture or other means for maintaining satisfactory lubrication in the stud construction, nor an adjustment means for removing excessive play in the stud construction as wear in the parts thereof progresses. Further, replacement and repair of the conventional stud assembly are costly and relatively difficult to perform, and the conditions producing the excessive wear in the original equipment, including the lack of adequate lubrication and poor adjustment of the stud assembly parts, are not eliminated or minimized. It is therefore one of the principal objects of the present invention to provide a stud construction for the center link of a steering assembly, which can be readily installed in the original sockets of the link and thereafter adjusted from time to time as wear occurs to eliminate excessive play, and which is so constructed and designed that it will normally last for the life of the automobile, requiring little attention or service to maintain it in satisfactory operating condition.

Another object of the present invention is to provide a versatile and durable rotatable stud unit for the steering assembly of automobiles, which is so constructed and designed that it can readily be adapted to center links of different sizes and adjusted to optimum operating condition, and thence locked to retain the unit in its installed position and adjusted condition.

Still another object of the invention is to provide a relatively simple rotatable stud unit of the aforesaid type, which can be easily installed and adjusted without the use of any special tools or equipment and without special skill on the part of the mechanic, and which can be readily lubricated while the vehicle is being lubricated in order to maintain the unit in satisfactory operating condition throughout the life of the vehicle.

A further object is to provide steering center link studs which can be mounted on one or both ends of the link as required without change in the stud construction, and which can be assembled in the original socket of the link without any substantial modification in the socket or in any other part of the link or steering assembly.

Additional objects and advantages of the present invention will become apparent from the following description and accompanying drawings, wherein.

Figure 4:
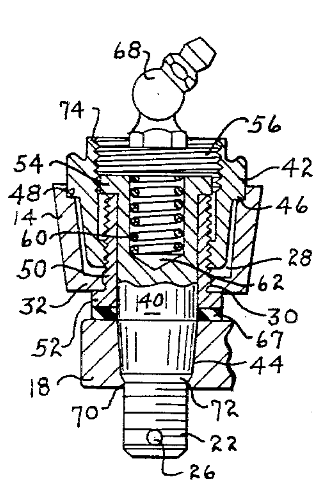
Figure 3:
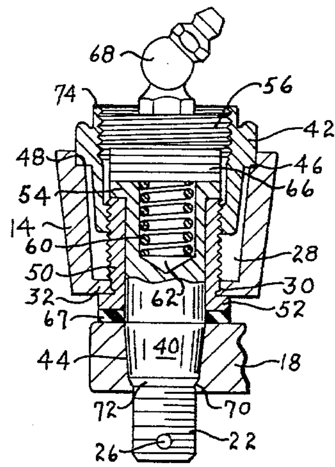
FIGURE 3 is a vertical cross sectional view through the present stud unit and through the socket of the center link, the section being taken on line 3—3 of FIGURE 2.
Figure 5:
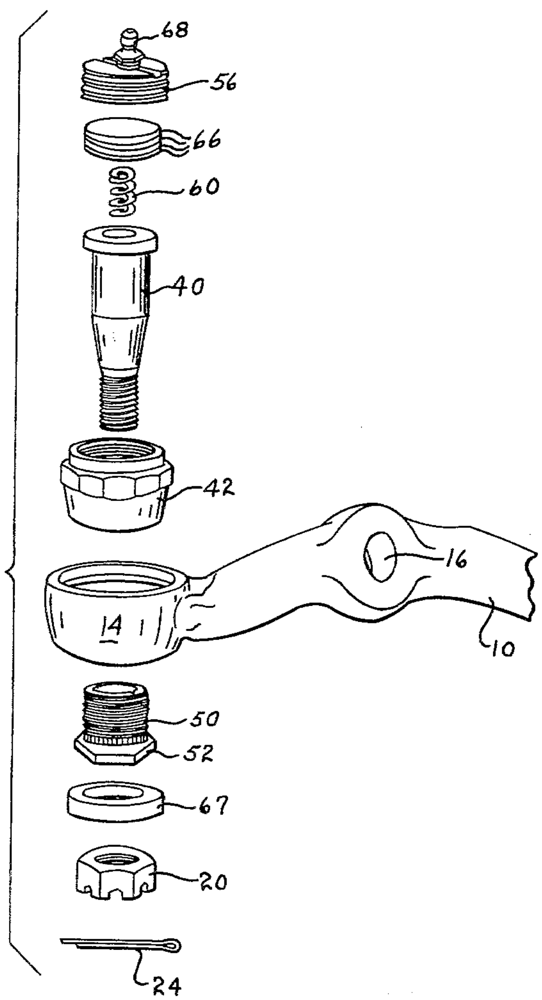

FIGURE 4 is a vertical cross sectional view through the stud unit and center link socket, showing the unit adapted to a smaller link and socket, the section being taken on the same section line as FIGURE 3; and FIGURE 5 is an exploded perspective view of the present rotatable stud construction and an end portion of the center link, showing the manner in which the parts of the unit are assembled in and disassembled from the socket in the center link.

Figure 1:
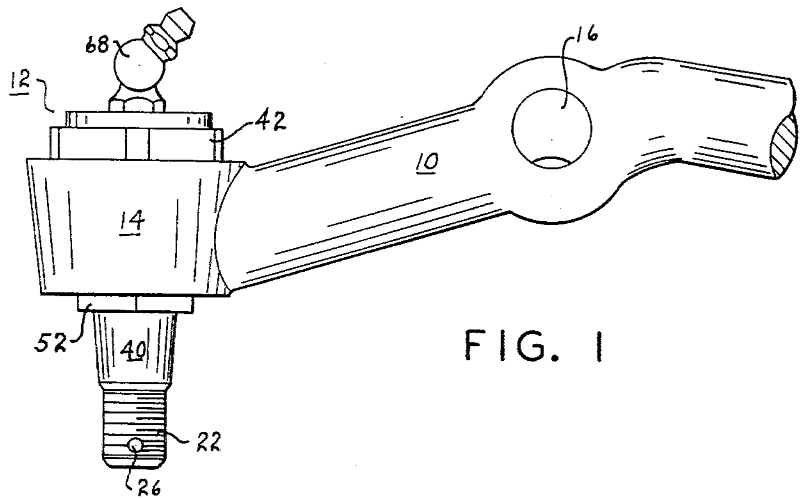
FIGURE 1 is a side elevational view of one end of the centering link of a steering assembly of an automobile, having mounted thereon the present rotatable stud unit.
Figure 2:
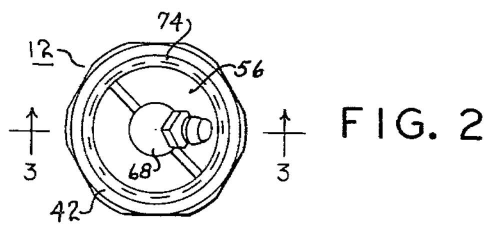
FIGURE 2 is a top plan view of the present rotatable stud unit removed from the socket thereof in the end of the center link shown in FIGURE 1.

Referring more specifically to the drawings and to FIGURE 1 in particular, numeral 10 designates one end of a center link of the steering assembly of an automobile, the link having the present stud unit 12 mounted in the socketed end member 14 and having a hole 16 spaced inwardly from the socket for receiving the connection of the pitman arm. The stud is connected to either the right or left tie rod 18, which is held on the stud by nut 20 threaded onto the lower end 22 of the stud, the nut being held thereon by cotter key 24 extending through hole 26. The shape of the stud embraced by the tie rod, the threaded portion 22 and nut 20 are of standard construction and size, as determined by the original tie rods on the vehicle. The center link 10 and end member 14 are joined integrally to one another and each end of the center link is connected to the respective tie rod leading to the right or left front wheel. The socket 28 in end member 14 is frusto-conically shaped and the original stud is secured therein by a plate or the like seated in the upper portion of the socket and held therein by a rolled upper edge of end 14. When the original stud is removed for replacement with the present stud, the rolled end is ground or otherwise removed from end member 14 and the original stud removed from socket 28. This leaves the socket fully exposed and adapted to receive the present rotatable stud unit 12 with the stud extending downwardly through hole 30 in bottom 32 of end member 14, hole 30 being slightly smaller in diameter than the bottom 32. The end member is generally frusto-conically shaped externally and may be more than one height, as shown in FIGURES 3 and 4, depending on the size and model of the vehicle.

The present stud unit 12 consists of a stud 40, seated in retainer 42 and extending downwardly through hole 30 in end member 14, and through hole 44 in tie rod 18. The retainer 42 is provided with an outwardly extending shoulder 46 which seats on shoulder 48 in the upper end of end member 14. In order to secure retainer 42 firmly in place and form a bearing for the stud, a sleeve bushing 50 extends upwardly through hole 30 and is threaded into the lower end of retainer 42, and as the bushing is tightened in the retainer, flange 52 seats firmly on the lower side of bottom 32 around hole 30. This construction firmly seats the retainer on shoulder 48 in socket 28 and flange 52 on the lower side of bottom 32, thus rigidly holding these two elements in end member 14. After the retainer and bushing have been secured in place, stud 40 is placed in the bushing, the shoulder 54 of the stud resting on the upper end of the bushing. The adjusting plug 56 is threaded into the upper end of retainer 42 and tightened down sufficiently to eliminate any undesirable play in the axial movement of stud 40 in bushing 50, a slight amount of play being desirable in order to permit the stud to rotate freely in the bushing. Shoulder 54 is preferably larger in diameter than bushing 50 to prevent the stud from being dislodged from the retainer and end member in the event the threads on the bushing should become stripped.

In order to seat flange 54 on the upper end of bushing 50 and assist in retaining it in that position during the operating of the present unit, a coil spring 60 is placed in a cylindrical recess 62 in the center of stud 40, the spring reacting against the bottom of recess 62 and against the bottom of the stack of spacers 66, disposed between the upper end of the stud and the underside of adjusting plug 56. The spacers are included for the purpose of permitting the present unit to be used in various size end members and with the largest center links on the standard automobiles, as illustrated in FIGURE 3. For the smaller end members and links, the present unit is used without spacers 66, as illustrated in FIGURE 4, in which case spring 60 reacts between the bottom of recess 62 and the underside of adjusting plug 56. A rubber washer 67 is preferably inserted between the upper side of tie rod 18 and the lower end of bushing 50 in order to seal the bearing surfaces in the unit from dirt, moisture and other foreign material.

One of the advantages of the present stud unit is the fact that it can be easily lubricated at the same time the vehicle is lubricated, using grease fitting 68 threadedly received in an opening in plug 56 and communicating with recess 62 and the interior of retainer 42. Grease forced through fixture 68 into the hollow interior of retainer 42 works its way inwardly between the upper edge of the bushing and flange 48 into the bore of bushing 50 around stud 40, thus fully lubricating the stud and maintaining it in optimum operating condition.

When the present unit is assembled in socket 28 of end member 14, retainer 42 and bushing 50 are assembled by inserting the bushing 50 through hole 30 and threading the retainer onto bushing 50. The stud is then placed in retainer 42 and downwardly through the bushing with the lower end of the stud extending below the bushing for receiving tie rod 18. After the tie rod has been assembled on the end of the bushing, as shown in FIGURES 3 and 4, with inwardly extending shoulder 70 of the tie rod seating against shoulder 72 of the stud, nut 20 is threaded onto the stud tightly against the underside of the tie rod, thereby firmly holding the tie rod and stud together and preventing relative rotation between the two. The cotter key 24 is then inserted through hole 26 locking the nut in its tightened position. If required, spacers 66 are placed in retainer 42 on the upper end of the stud against spring 60 and plug 56 is threaded into the upper end of the retainer until very little clearance exists between the upper end of the stud and the underside of the spacers, as shown in FIGURE 3, or the underside of the plug, as shown in FIGURE 4. After the unit has been assembled in socket 28 of end member 14, as just described, and adjusted to the proper position to eliminate any undesirable play, the flange 74 of retainer 42 is staked, i.e., bent inwardly with a punch or the like, to prevent accidental loosening of plug 56. Preferably, end member 14 is staked adjacent retainer 42 to prevent the retainer from rotating in socket 28. After the unit has been assembled in the foregoing manner, a suitable lubricant is injected through fixture 68 to thoroughly lubricate the stud 40 in bushing 50.

Although only one embodiment of the present invention has been described in detail herein, various changes and modifications may be made to satisfy installation requirements, without departing from the scope of the present invention. Throughout the description and in the claims, the terms "top" and "bottom" and "up" and "down" have been used for convenience of description, and are not limitations with respect to the position in which the stud units are used. The present rotatable stud may be used for a variety of different purposes and with other rods and levers than those shown in the drawings.

I claim:

1. For use with a steering assembly having a center link with a socket means and an opening in the bottom of the socket means: a rotatable stud unit, comprising a cylindrical-shaped retainer adapted to seat in said socket means and having a bore therethrough and screw threads on the internal wall adjacent each end of said bore, an external flange near one end thereof for engaging said socket means near the top thereof, a bushing adapted to extend through the opening in the bottom of said socket means and threaded into the bore of said retainer and having a flange on the lower end for engaging the bottom of said socket means, a stud with a recess in the upper end extending through said bushing and downwardly therefrom for receiving a rod, a nut on the lower end of said stud for retaining said rod thereon, a flange on the upper end of said stud for seating on the upper end of said bushing, an adjustment plug threadedly received in the upper end of said retainer, a plurality of spacers between said stud and said plug, a coil spring in the recess in said stud engaging the adjacent spacer, and a lubricating fixture in said plug communicating with the bore in said retainer.

2. For use with a steering assembly having a link with a socket means and an opening in the bottom of the socket means: a rotatable stud unit, comprising a retainer adapted to seat in said socket means and having a bore therethrough and screw threads on the internal wall adjacent each end of said bore, an external flange near one end thereof for engaging said socket means near the top thereof, a bushing adapted to extend through the opening in the bottom of said socket means and threaded into the bore of said retainer, a stud with a recess in the upper end extending through said bushing and downwardly therefrom for receiving a lever, a nut on the lower end of said stud for retaining said lever thereon, a flange on the upper end of said stud for seating on the upper end of said bushing, an adjustment plug threadedly received in the upper end of said retainer, a spacer between said stud and said plug, a spring in the recess in said stud engaging said spacer, and a lubricating fixture in said plug communicating with the bore in said retainer.

References Cited in the file of this patent

UNITED STATES PATENTS

| | | |
|---|---|---|
| 1,451,040 | Gulick | Apr. 10, 1923 |
| 1,697,784 | Seaholm | Jan. 1, 1929 |
| 1,788,083 | Church | Jan. 6, 1931 |

FOREIGN PATENTS

| | | |
|---|---|---|
| 37,970 | Denmark | Sept. 9, 1927 |
| 303,377 | Switzerland | Feb. 1, 1955 |